Figure 12:
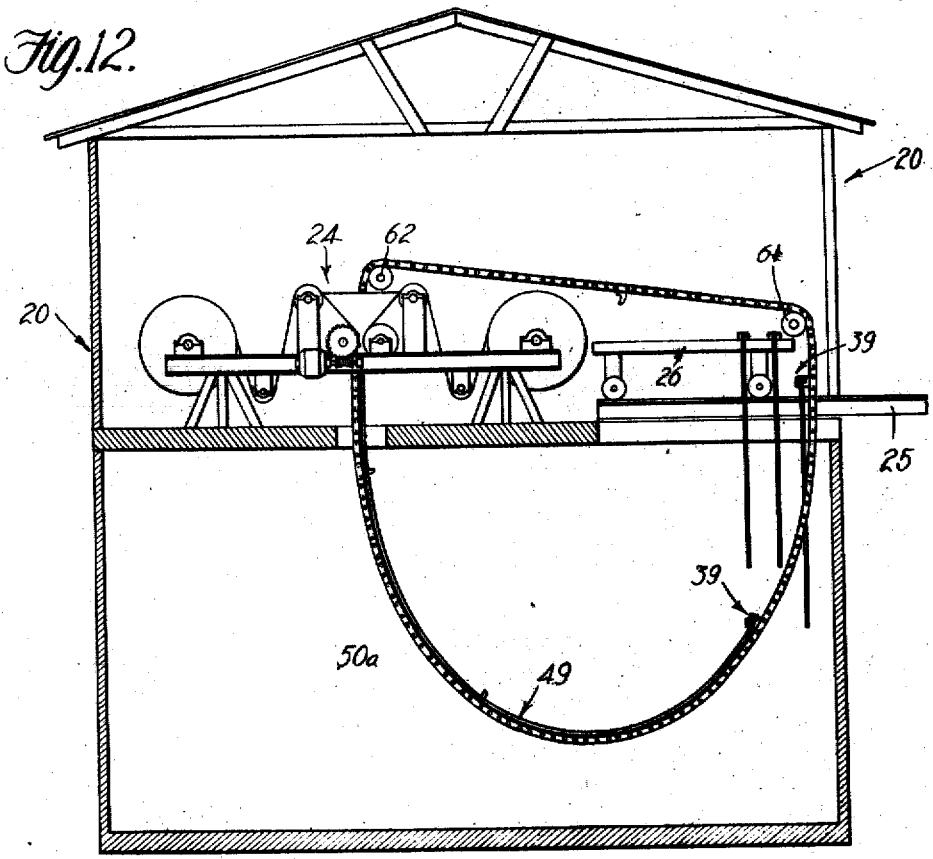

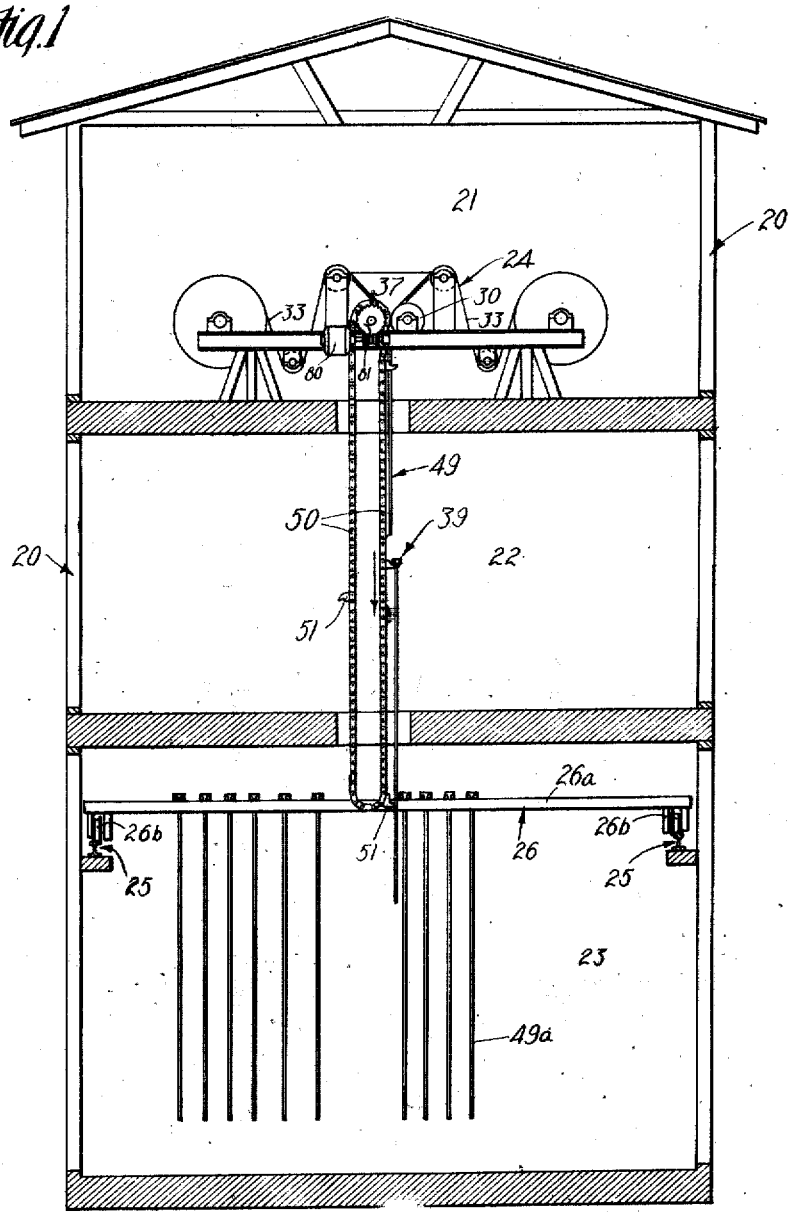

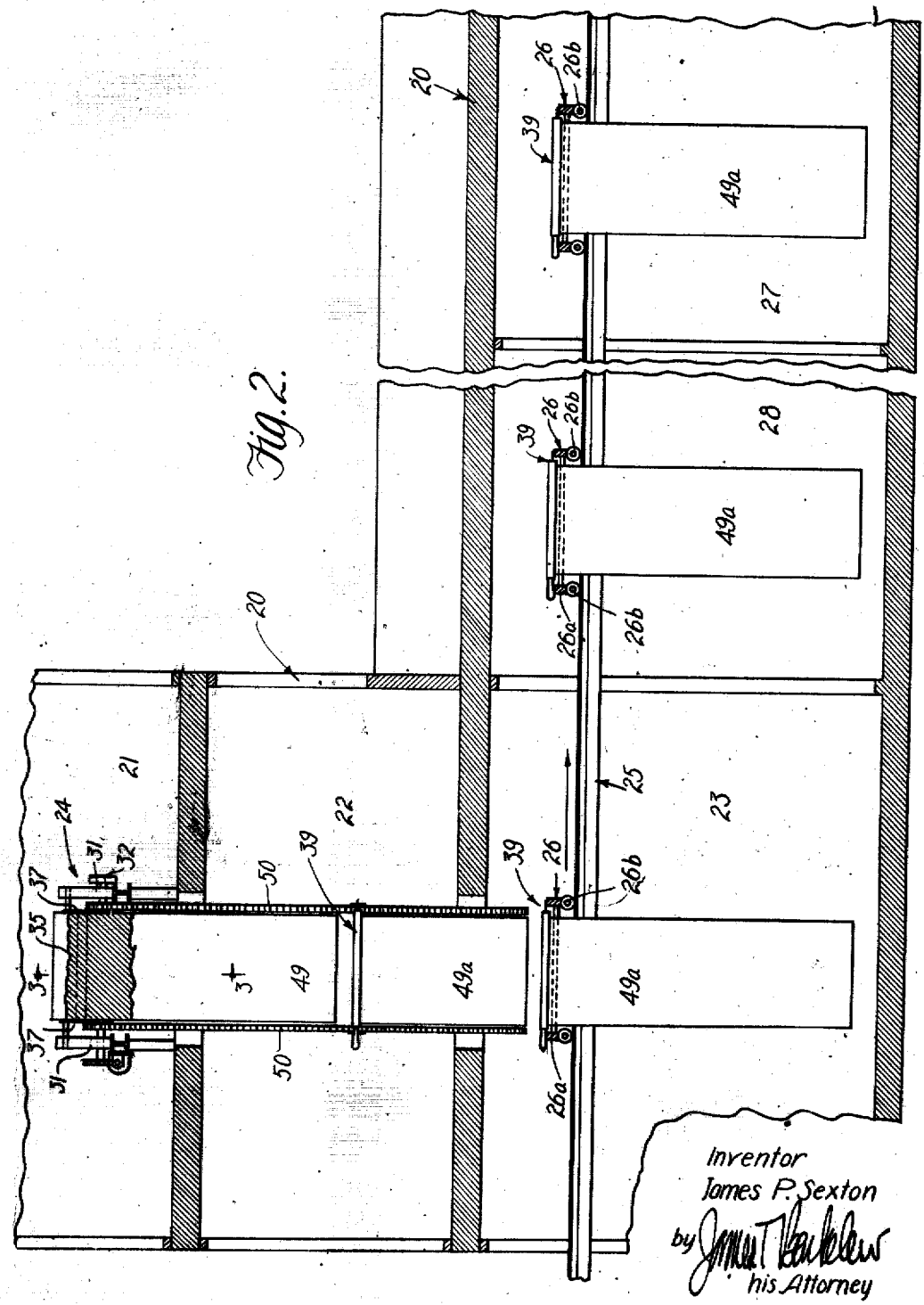

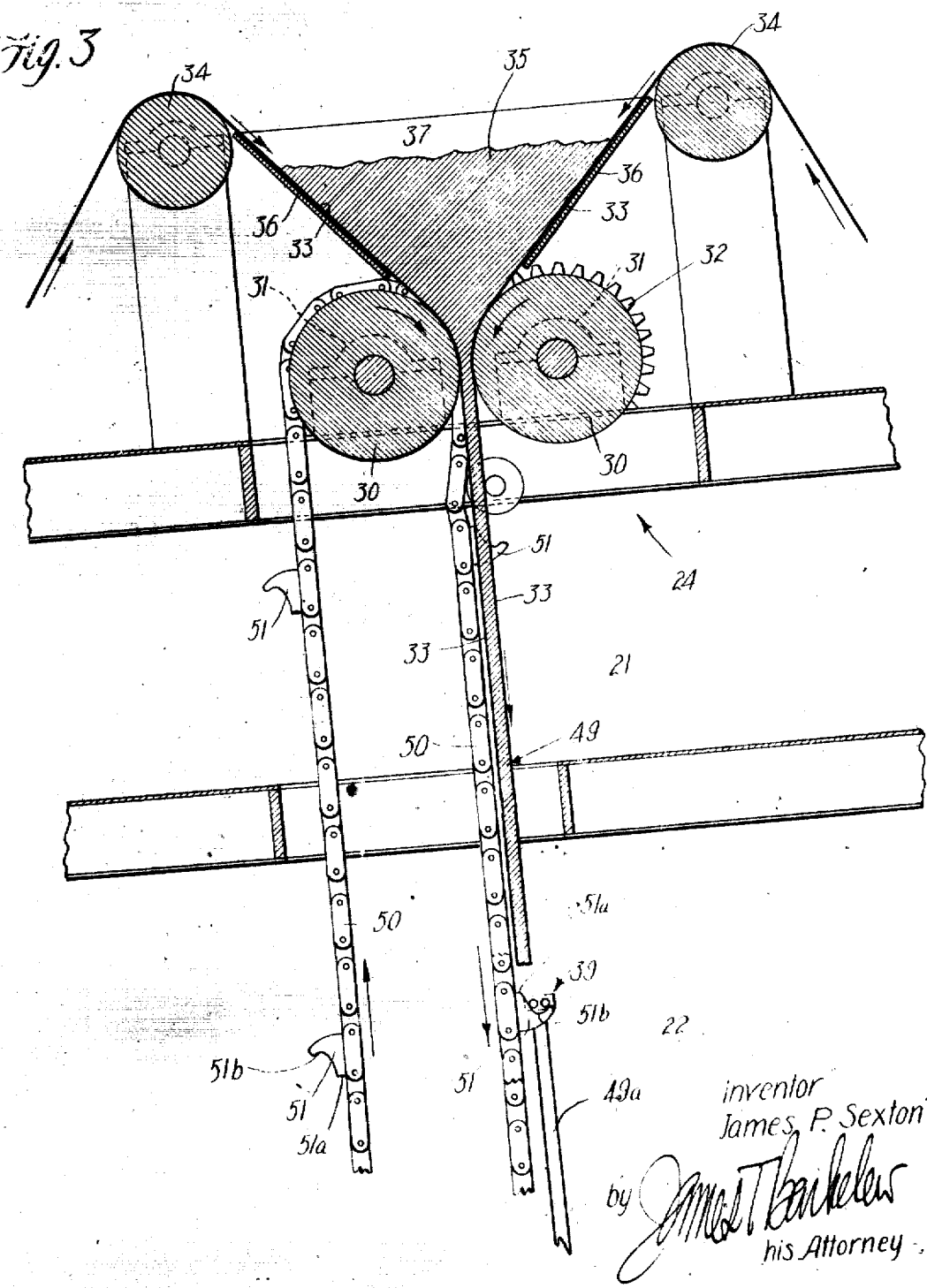

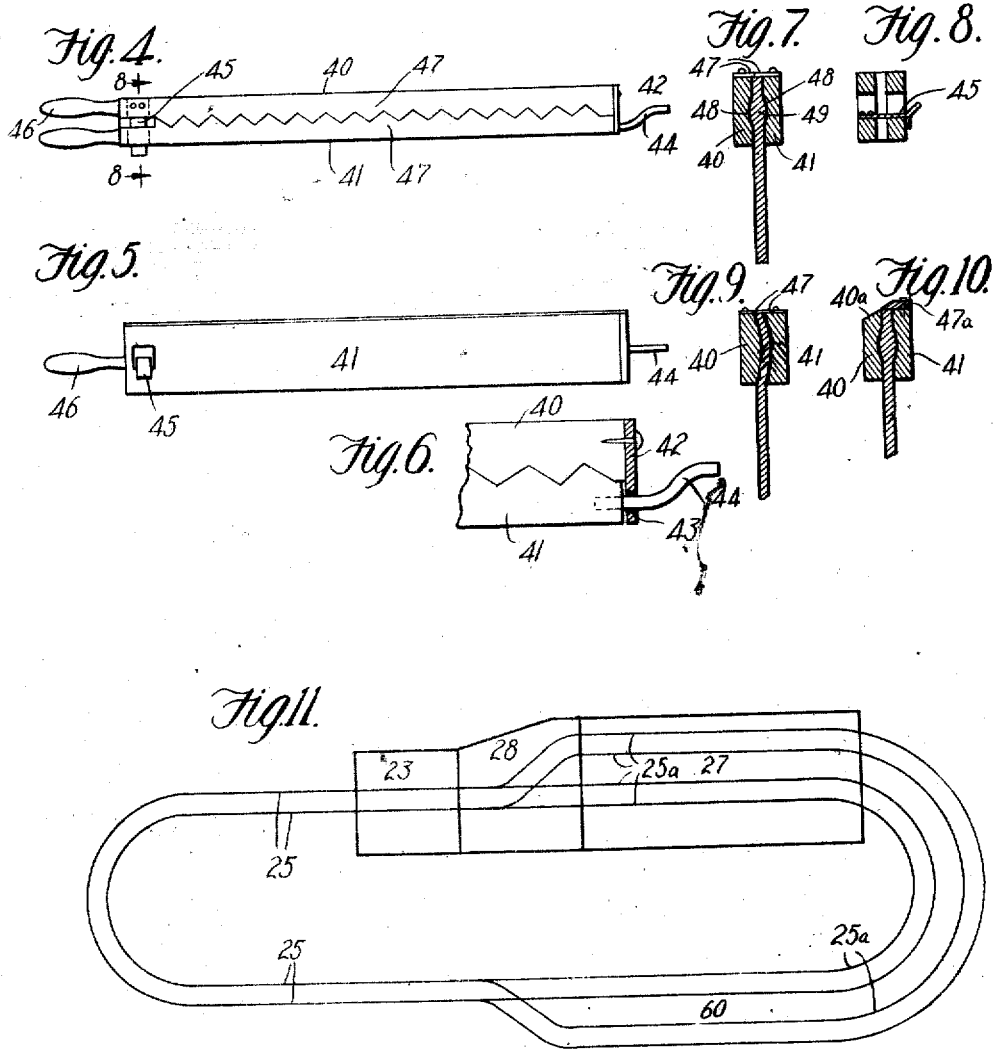

J. P. SEXTON.
METHOD OF FORMING PLASTIC BOARD AND THE LIKE.
APPLICATION FILED DEC. 19, 1917.

1,324,471.

Patented Dec. 9, 1919.
6 SHEETS—SHEET 5.

Inventor
James P. Sexton
by James T. Barkelew
his Attorney

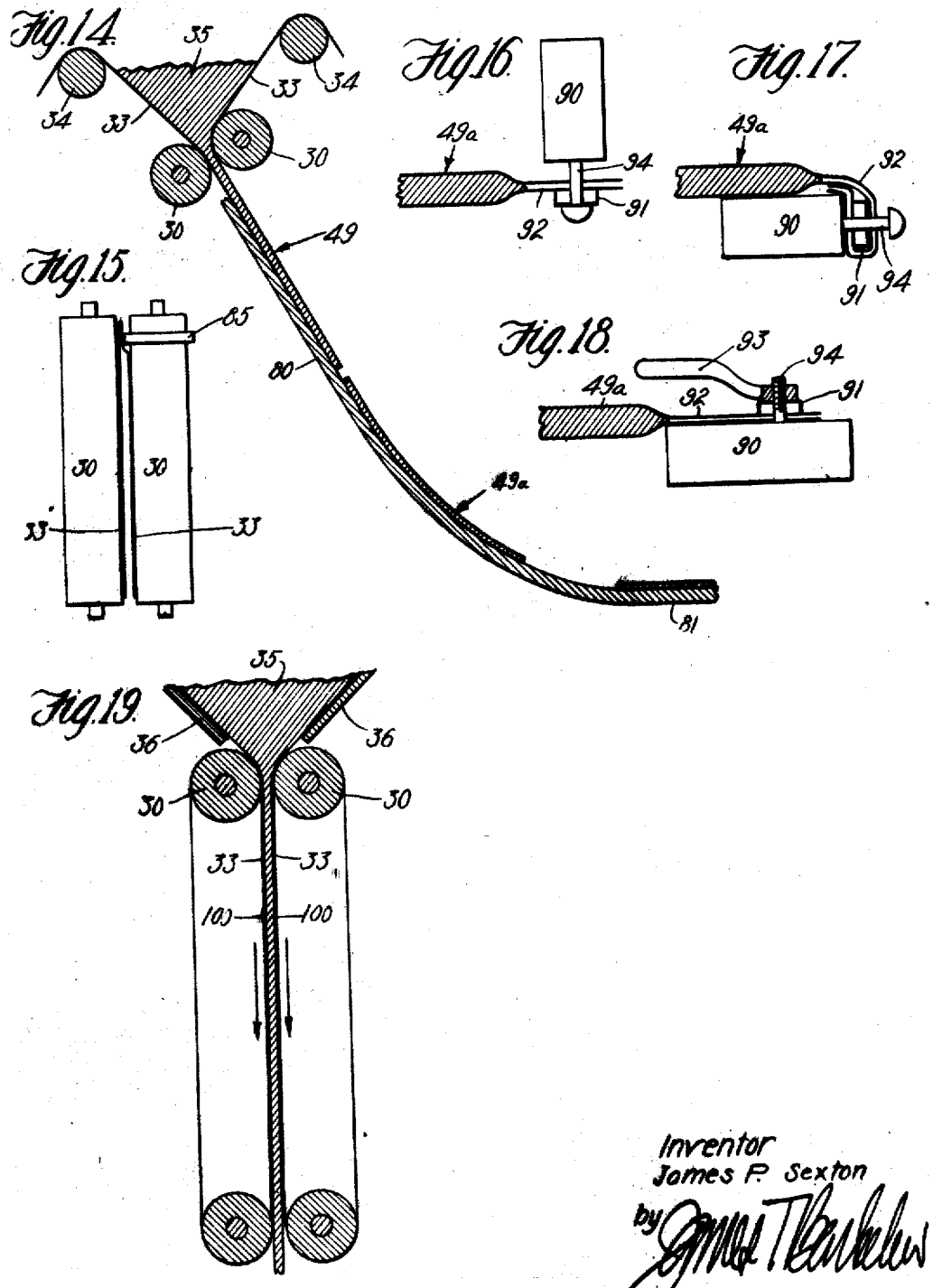

UNITED STATES PATENT OFFICE.

JAMES P. SEXTON, OF LOS ANGELES, CALIFORNIA.

METHOD OF FORMING PLASTIC BOARD AND THE LIKE.

1,324,471.  Specification of Letters Patent.  Patented Dec. 9, 1919.

Application filed December 19, 1917. Serial No. 207,855.

*To all whom it may concern:*

Be it known that I, JAMES P. SEXTON, a citizen of the United States, residing at Los Angeles, in the county of Los Angeles, State of California, have invented new and useful Improvements in Methods of Forming Plastic Board and the like, of which the following is a specification.

This invention relates to such articles known as wall boards, plaster boards, and the like, which are formed of a plastic material, or are formed of materials including a plastic material. Although my invention is generally applicable to boards of the general nature defined, I have applied my invention particularly to an article known as plaster board. Such a plaster board may comprise a pair of face sheets, of paper or such material, carrying between them a body of plastic material, such as plaster of any kind. And, although I do not limit my invention to such an application, I herein describe my invention as applied to such a plaster board.

Plaster boards have heretofore been formed in various manners; including formation in short lengths, and including continuous formation upon a horizontally moving belt or the like. Such prior methods of formation have generally embodied the laying down of one sheet of paper, the placement thereon of the plastic material, and the subsequent placement of the top paper sheet; the whole being subjected to such pressure as the freely flowing plastic material will stand under a roller or other suitable means for exerting pressure upon the board. After such formation, the boards are then usually handled in horizontal position, supported upon a table, belt, or the like, either singly or in a pile; and they must be supported in flat, horizontal position until they have sufficiently set to enable them to be handled.

A distinctive feature of my new method is that the boards are so formed that they move substantially vertically, preferably downwardly, from the point of formation. I form a typical plaster board by bringing downwardly convergently toward each other two facing sheets and supplying the plastic material between them and then moving the formed plaster board away in a general vertical direction from the point of formation. Preferably I gravitate the formed board away from the point of formation; and, further, preferably, I allow the formed board to hang pendulously from the point of formation. Thus, as the board is formed, it moves downwardly, in its pendulous position; and I then sever suitable lengths from the continuous board thus formed and thus hanging. These severed lengths I preferably immediately suspend, preferably in spaced relation; and the lengths so spacedly suspended, are then allowed to set and are dried while so hung.

Forming the board in this manner enables me to not only make a better product, but also to do away with a substantial part of the machinery now commonly in use in making plaster board. It enables me to use materials which set and dry more quickly than the materials heretofore used; and to carry on the operations of setting and drying without disturbing the board in any manner whatsoever during those operations. In fact, my system and method of formation enable me, if I so desire, to carry the board through the operations of setting and drying without handling the board in any manner whatsoever.

The general scope of my invention, its features, and the advantages flowing therefrom, will be best understood by reference to the following specification, wherein I describe preferred modes of procedure, indicating and typifying my invention; and reference being further had to the accompanying drawings in which I illustrate suitable mechanism for carrying on my method.

Figure 13:
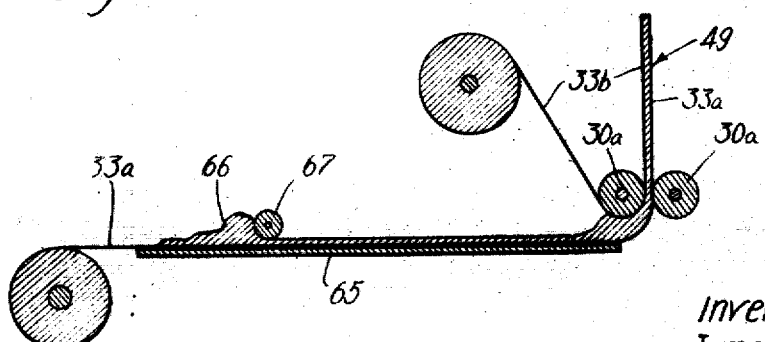

Figure 1 is a vertical transverse sectional elevation showing a typical form of mechanism for carrying on my process; Fig. 2 is a longitudinal sectional elevation of the same; Fig. 3 is an enlarged detail section taken as indicated by line 3—3 on Fig. 2; Fig. 4 is a plan of one form of clamp and cutter which I may use to sever the continuously formed board; Fig. 5 is a side elevation of the same; Fig. 6 is an enlarged view of an end portion of the clamp and cutter, showing parts in section; Fig. 7 is a transverse section showing one form of the section of the clamp; Fig. 8 is a transverse section on line 8—8 on Fig. 4; showing a means of holding a clamp together; Fig. 9 is a section showing a modified form of the clamp; Fig. 10 is a section showing a modified form of cutter; Fig. 11 is a diagram showing a typical general plan of a plant to carry on my method; Fig. 12 is a vertical transverse sectional elevation showing a modified form of mechanism; Figs. 13, 14, and 15 are diagrams illustrating modified forms of mechanism for forming the plaster board; Figs. 16, 17, and 18 show modified forms of clamps; and Fig. 19 shows another modification of the mechanism.

In the drawings, referring first to Figs. 1 to 11, I show a suitable structure 20 which, in the form shown in Fig. 1, has a part provided with three stories embodying compartments 21, 22 and 23, one above the other. The compartment 21 contains the forming machinery 24; the compartment 22 is the one through which the formed plaster board passes while it is being cut; and the compartment 23 accommodates the tracks 25 and the drying carriers 26.

The form of mechanism now about to be described is one in which the plaster board is formed while the face sheets are traveling downwardly; in which the formed plaster board hangs pendulously from the forming machinery and is severed into lengths while thus hanging pendulously; and in which the severed lengths are then moved on downwardly and are deposited, hanging in, the same pendulous position, upon a drying carrier, the drying carrier conveying the suspended lengths away to the drying room 27, passing through the transfer room 28 on the way to the drying room.

The forming machinery is best shown in Fig. 3. I employ a pair of forming rolls 30 mounted in bearings 31. These rolls may be geared together by gears 32 if so desired, so that they will rotate at equal speeds in opposite directions as indicated in Fig. 3; although I have found by actual practice that this gearing of the rolls may not be necessary. The two paper facing sheets 33 preferably pass diagonally downwardly from over rolls 34 and converge toward each other and pass over the inner opposing faces of the forming rolls 30; and then pass vertically downwardly as indicated. Where the two sheets 33 pass convergently downwardly they form the opposite inclined sides of a hopper which holds the supply of plastic material 35. The two sheets may be supported by passing over plates 36, so as to support the weight of the plastic material; and the sides of the hopper may be formed by suitable plates as shown at 37. The plastic material may be fed into the hopper from any suitable mixer. The rotation of rolls 30 causes the downward movement of the paper sheets and causes the downward movement of the plastic material between the paper sheets and between the rolls 30. The paper sheets move under the mass of material at 35, causing the material to be efficiently "scoured" into the paper. making a more perfect bond with the paper than is otherwise possible. Furthermore, the weight of the plastic mass 35 (which weight may be made as large as desired by the simple expedient of varying the size of the hopper) causes a certain pressure on the plastic material between the rolls 30, creating a greater pressure between the rolls, and forcing the plastic material into a more dense and compact and evenly distributed mass between the two sheets of paper, than is the case where the plaster board is formed while traveling in a horizontal direction between the two rolls spaced one above the other. For this reason, a firmer and less fluid plastic material may be used, because the greater pressure enables this less fluid material to be satisfactorily compacted between the paper sheet. Such a plastic material sets and dries quickly.

This preferred method and mechanism have the advantages set forth hereinabove; but the broader aspects of my invention do not require such preferred operation. For instance, the paper sheets may be fed in directly over the rolls 30 without coming down diagonally and convergently.

After formation between the forming rolls 30, the finished continuous length of plaster board moves downwardly, and, in this particular form of mechanism and method, hangs pendulously from the forming rolls. Hanging in this position, the plaster board is kept free from any distortion. In the compartment 22 this continuous pendulous sheet of board is severed into suitable lengths. This may be done by any suitable means, by any suitable cutting mechanism; or it may be very expeditiously accomplished by a cutter mounted upon a clamp. I show the details of such clamps and cutters in Figs. 4 to 10. I provide a clamp with two side bars 40 and 41. For purposes of ease in putting the clamp around the continuous length of plaster board, these two side boards 40 and 41 are not permanently connected together but are connected at one end by the operation of a plate 42 secured to member 40 and having an aperture 43 through which a pin 44 loosely passes, pin 44 being mounted upon member 41, and the pin 44 may be bent or inclined in position, so that when it is inserted in the opening 43, its longitudinal movement will cause the member 41 to be moved laterally toward the member 30 to securely engage the plaster board at that end of the clamp. At the other end of the clamp I may provide a suitable spring catch 45; and handles 46 may be provided for manipulating the clamp. These handles 46, and the pin 44 may also provide the means of suspending the clamp upon the carrier mechanisms. I show each member 40 and 41 equipped with a serrated or tooth cutter 47 adapted to cut or sever the plaster board at the top of the clamp when the clamp is applied thereto. The interior surfaces of the clamp members 40 and 41 are preferably made with grooves or hollows as shown at 48, so as to form a bulge in the plastic material at 49 to more firmly and securely hold the still plastic board. In Fig. 9 I show a modification of such arrangement in which the inner face of member 40 is convex and the inner face of member 41 is concave, but more concave than member 40 is convex, so as to make, in effect, the same bulging of material as in the form shown in Fig. 7.

In Fig. 10 I show a clamp equipped with a different form of cutter. The member 40 may be beveled off as at 40$^a$, and a strip of suitable hard wood may be secured to the upper edge of member 41, as shown at 47$^a$; this strip having a sharpened edge toward the member 40. I have found that such a wooden cutter, even when having a very dull edge, will easily shear the plaster lath while it is yet in plastic condition. These combined clamps and cutters, designated generally by the numeral 39 in Figs. 1, 2 and 3, are applied in any suitable manner to the continuous pendulous strip passing down through the compartment 22. A pair of vertically traveling chains 50 travel in the positions shown in the drawings, one on each side of the pendulous strip. These chains 50 travel over sprockets on the shaft of roller 30, and are arranged to travel at the same speed as the formed board 33. These chains carry supporting brackets 51 at suitable intervals. In practice, chains 50 are made of such length, and the brackets 51 so spaced, that lengths of different dimensions may be severed from the continuous board. The downwardly traveling sides of the chain 50 travel approximately in the position illustrated with reference to the pendulous board 49. The operator inserts one part of the cutter clamp between the chains and the board and he may accurately position the clamp by alining it with or upon the upper shoulder 51$^a$ of the clamp. He then puts the other part of the clamp in place on the opposite side of the board and closes the clamp on the board. The length of board is thus simultaneously severed from the continuous board and is held by the clamp 39. The weight of the severed length thus coming upon the clamp, causes the clamp to slip down the bracket 51 into the lower hook part of the bracket, at 51$^b$, the clamp sliding outwardly away from the chains at the same time. This slight outward movement of the clamp carries the severed length of board 49$^a$ somewhat away from the chains so that there is no liability of the chains striking it. The severed length passes on down, by the downward movement of the chains, until the clamp 39 is deposited upon the carrier 26. This carrier 26 may comprise a simple form of overhead carrier embodying a pair of beams 26$^a$ carried upon wheels or rollers 26$^b$ running on the tracks 25. As the successive severed lengths of board are deposited on the beams 26$^a$, the previously deposited lengths may be moved along the beams until the carrier is loaded to its capacity, carrying the suspended lengths of plaster board in spaced relation to each other. It will be noted that the suspended lengths can not be placed any closer to each other than the thickness of the clamp parts will allow; and these clamp parts may be made of such thickness as to give the proper minimum spacing. When a carrier 26 is thus loaded, it is moved away into the transfer room 28, and another carrier is moved into position to be next loaded. The transfer room 28 may be of any suitable length, to accommodate any suitable number of carriers, and is provided for the purpose of allowing the severed lengths to somewhat dry and set before being carried into the higher temperature of the drying room 27. In the drying room 27 the parts are thoroughly dried. Now, the carriers with their suspended boards may be moved more or less continuously through the transfer and drying rooms, or the rooms may be filled to capacity and a whole batch dried at once and then moved out. In any case, I may provide such an arrangement as is shown in diagram in Fig. 11. In this diagram I show the compartments 23, 28 and 27, being respectively, the rooms in which the carriers are loaded, the transfer room and the drying room or kiln. The tracks 25 extend through the room 23 and in the transfer room 28 the track 25 may branch into two tracks 25$^a$, and the double tracks may extend through the drying room 27. These double tracks may extend on around and back parallel to the rooms, being preferably extended in double form to the point designated 60, where the boards may be taken off the carrier; the double track facilitating efficiency in handling the carriers and taking off the boards. After passing this point the double tracks may again converge into the single track 25 which extends on around and enters the room 23. The carriers are moved in this closed circuit around the tracks. Double trackage in the drying room allows one track to be filled in the process of drying while the opposite track is being filled or being emptied.

The rolls 30 may be run from a motor 80 through the medium of worm gearing 81. I prefer worm gearing for reasons stated as follows. When the machinery is started power is required; but as soon as the pendulous length of board has been formed, then the weight of this length will run the mechanism; and, if a brake of some sort is not provided, the machinery will run away.

The motor and its worm gear provides a suitable brake to keep the mechanism running at the proper speed.

Now, although I describe the formed board as hanging vertically and pendulously, this is not essential to the process. The formed board may move substantially vertically, either upwardly or downwardly, or it may move downwardly in any manner in which it may gravitate. For instance, it may be moved off over an inclined chute or surface—either up or down.

In Fig. 12 I show a somewhat modified form of arrangement in which the board forming mechanism 24 may be the same as herein described, but the chains 50ª, instead of extending down vertically, may extend down and then horizontally and then upwardly, passing over rollers or idlers at 61 and 62 to pass back to the mechanism 44. The continuous length of formed board 49 may be carried around with the chains in the somewhat curved or bent formation illustrated, without hurting the board, as it is still plastic. The boards are severed at a suitable point, and are supported by the clamps 39 in the same manner as before explained, and are dropped upon the carriers 26 where the chain turns over the idlers 61; the carrier 26 traveling upon the rails 25. This arrangement has the advantage of decreasing the height of the structure 20; and it still retains the advantage of forming the plaster board in a vertical position and of then pendulously hanging it in a vertical position for drying and setting; the board having only undergone a slight distortion while still plastic.

In Fig. 13 I indicate in diagram how the continuous length of board 49 may be made between horizontally spaced rolls 30ª. One paper sheet 33ª may be drawn in horizontally over a table or other horizontal surface at 65; the plaster being buttered onto the paper sheet 33ª by being fed on at 66 and passing under a roll 67. The other paper sheet 33ᵇ is fed under one of the rolls 30ª. Two paper sheets 33ᵇ and 33ª, with the interposed plaster, are drawn upwardly from between the rolls 30ª. This may be done in any suitable manner. It has been done by hand. The vertical continuous length of board thus formed may be severed into suitable lengths and suspended and allowed to set and dry.

In Fig. 14 I indicate how the board may be formed at an angle to the perpendicular. Here the rolls are set in such position that the board 49 may move off down the inclined chute or carrier 80. The length of board may be cut while in the incline or after it reaches a horizontal part 81 of the chute; if cut on the incline the severed lengths 49ª may be allowed to move on down to the horizontal position and there be picked up or otherwise moved off.

In any method of formation it may be advantageous to place the clamp upon the side edge rather than the end edge of the board; and for this purpose I may leave the side edge of the board unfilled with plaster. This I may do by placing a collar 85 around one of the rollers 30 to crowd one of the sheets 33 over against the other at one edge. This edge then forms a selvage to be finally severed from the finished board. Any suitable form of clamp may be used to engage this selvage edge; such forms are shown in Figs. 16 to 18. In Fig. 18 I employ a bar 90 with a channel bar 91, between which the selvage edge 92 may be clamped by the clamp screws 92 and handles 93. In Figs. 16 and 17 the bar 90 carries the channel bar 91 loosely mounted on screws 94 to move loosely to and from the bar 90. The selvage edge 92 is passed between the two clamp bars as shown in Fig. 16 and the clamp bars then are twisted around to the position shown in Fig. 17. The selvage edge is then held tightly between the bars; and when the board 49ª is suspended from the clamp the bar 91 is then pulled down on the selvage edge by the weight of the board.

In Fig. 19 I illustrate how my general method may be applied to making plaster boards wherein the interior plaster projects through perforations in the sheets 33. In such a case the plaster will be pressed out through the perforations if no backing is used. In the form shown in Fig. 14, or in any similar form, where a chute is used, the chute surface may form the necessary backing, the perforated sheet being placed next the chute surface. However, in such a case, and particularly where both the sheets 33 are perforated, I may run the board 49 between two belts (metal or other material) as shown at 100, running over rolls 30 and moving down parallel under the rolls. This arrangement may be used with any of the forms and any of the methods herein described.

From the foregoing description, it is believed that my invention will be readily understood.

The advantageous features of forming the board or the like in vertical position, and of suspending it in vertical position while setting and drying have been fully explained. In the art herein indicated, I believe that my invention is broad in its character and scope and is not limited to the specific mechanical details herein set forth, nor to the specific details of procedure herein set forth; and the following claims are therefore directed to the broad aspect of my invention as well as to the preferred specific forms thereof.

Having described a preferred form of my invention, I claim:

1. The herein described method of making plastic boards and the like, embodying forming the board from materials including a plastic material with the board in a vertical plane, and allowing the formed board to set while suspended in a vertical plane.

2. The herein described method of making plastic boards and the like, embodying forming the board in a vertical suspended position, and allowing the board to set while in a suspended position.

3. The herein described method of making plastic boards and the like, embodying forming the board in a vertical suspended position, and allowing the board to set and drying it while in a suspended position.

4. The herein described method of making plastic board and the like, embodying forming the board in a continuous pendulous sheet, severing the sheet into lengths and suspending the severed lengths.

5. The herein described method of making plastic board and the like, embodying forming the board in a continuous pendulous sheet, severing the sheet into lengths, suspending the severed lengths, and allowing the severed lengths to set and drying them while so suspended.

6. The herein described method of making plastic board and the like, embodying forming the board in a continuous pendulous sheet, severing the sheet into lengths, suspending the severed lengths in spaced relation, and drying the severed lengths while so suspended in spaced relation.

7. The herein described method of making plastic board and the like, embodying forming the board in a continuous pendulous sheet, clamping the formed board at spaced points and simultaneously severing and suspending the severed lengths from their upper clamped ends.

8. The herein described method of making plastic board and the like, embodying forming the board in a continuous pendulous sheet, clamping the formed board at spaced points, simultaneously severing and suspending the severed lengths from their upper clamped ends in spaced relation, and drying the lengths while so suspended in spaced relation.

9. The herein described method of making plastic board and the like, embodying forming the board in a continuous pendulous sheet, clamping the formed board at spaced points and simultaneously severing the board just above the points of clamping, suspending the severed lengths to set and drying them while so suspended in spaced relation.

10. The herein described method of making plastic board and the like, embodying convergently moving two facing sheets downwardly and toward each other, and then moving the two sheets vertically downwardly parallel to each other, and supplying a plastic substance between the sheets where they converge, said substance being supplied in such quantity as to cause an excess mass of said substance to be present between the converging sheets, then severing the downward moving board into lengths, and suspending the severed lengths.

11. The herein described method of making plastic board and the like, embodying convergently moving two facing sheets downwardly and toward each other, and then moving the two sheets vertically downwardly parallel to each other, and supplying a plastic substance between the sheets where they converge, said substance being supplied in such quantity as to cause an excess mass of said substance to be present between the converging sheets, then severing the downward moving board into lengths, and suspending the severed lengths, in spaced relation, and allowing the lengths to set and drying them while so suspended in spaced relation.

12. The herein described method of making plastic board and the like, embodying convergently moving two facing sheets downwardly and toward each other and then allowing the two sheets to move downwardly hanging pendulously parallel to each other, and supplying a plastic substance between the two sheets, then severing the pendulous plastic board into lengths and suspending the lengths.

13. The herein described method of making plastic board and the like, embodying convergently moving two facing sheets downwardly and toward each other and then allowing the two sheets to move downwardly hanging pendulously parallel to each other, and supplying a plastic substance between the two sheets, then severing the pendulous plastic board into lengths and suspending the lengths, and allowing the lengths to set while so suspended.

14. The herein described method of making plastic board and the like, embodying convergently moving two facing sheets downwardly and toward each other and then allowing the two sheets to move downwardly hanging pendulously parallel to each other, and supplying a plastic substance between the two sheets, then severing the pendulous plastic board into lengths and suspending the lengths in spaced relation, and allowing the lengths to set and drying them while so spacedly suspended.

15. The herein described method of making plastic board and the like, embodying convergently moving two facing sheets downwardly and toward each other and supplying an unset plastic substance between the two sheets, and then allowing the two sheets with the interposed plastic substance to move downwardly hanging pendulously.

16. The herein described method of making plastic board and the like, embodying forming the board in a continuous sheet, causing the formed board to move away from the point of formation, severing it into successive lengths, and causing the successively severed lengths to move away from the moving board in the direction of movement thereof.

17. The herein described method of making plastic board and the like, embodying forming the board in a continuous sheet, causing the formed board to move away from the point of formation, severing it into successive lengths, and causing the successively severed lengths to move away from the moving board in the direction of movement thereof, and suspending the severed lengths.

18. The herein described method of making plastic board and the like, embodying forming the board in a continuous sheet, allowing the formed board to gravitate away from the point of formation, severing the formed board into lengths and allowing each successively severed length to drop away from the downwardly moving formed board.

19. The herein described method of making plastic board and the like, embodying forming a composite board of sheets of material and interposed unset plastic substance, suspending lengths of the formed board and allowing the lengths to set while so suspended.

20. The herein described method of making plastic board and the like, embodying forming the board in a continuous sheet, clamping and severing the formed board at spaced points along its length, and suspending each severed length from its clamped end.

In witness that I claim the foregoing I have hereunto subscribed my name this 4th day of December.

JAMES P. SEXTON.

Witness:
V. BERINGER.